(12) United States Patent
Jones et al.

(10) Patent No.: US 7,706,904 B2
(45) Date of Patent: Apr. 27, 2010

(54) ATTRACTION MULTILANGUAGE AUDIO DEVICE AND METHOD

(75) Inventors: Matthew Preston Jones, Honolulu, HI (US); Steven C. Blum, Orlando, FL (US); Justin Michael Schwartz, Orlando, FL (US); Brian McQuillian, Orlando, FL (US)

(73) Assignee: Universal City Studios LLLP, Universal City, CA (US)

( * ) Notice: Subject to any disclaimer, the term of this patent is extended or adjusted under 35 U.S.C. 154(b) by 731 days.

(21) Appl. No.: 11/608,297

(22) Filed: Dec. 8, 2006

(65) Prior Publication Data

US 2008/0140382 A1 Jun. 12, 2008

(51) Int. Cl.
*G06F 17/00* (2006.01)
(52) U.S. Cl. ............................................. 700/94; 704/8
(58) Field of Classification Search .................... 700/94; 455/3.01, 3.03, 3.04, 3.06, 414.3, 414.4
See application file for complete search history.

(56) References Cited

U.S. PATENT DOCUMENTS

| | | | |
|---|---|---|---|
| 5,557,541 A | * | 9/1996 | Schulhof et al. ............... 700/94 |
| 6,785,539 B2 | | 8/2004 | Hale et al. |
| 2003/0110216 A1 | * | 6/2003 | Althin et al. ................. 709/204 |
| 2003/0142983 A1 | * | 7/2003 | James et al. ................. 398/107 |
| 2005/0003811 A1 | * | 1/2005 | Hale et al. ............... 455/422.1 |

FOREIGN PATENT DOCUMENTS

| | | |
|---|---|---|
| EP | 1684253 A | 7/2006 |
| WO | 02/052758 A | 7/2002 |

* cited by examiner

*Primary Examiner*—Walter F Briney, III
(74) *Attorney, Agent, or Firm*—GE Global Patent Operation; Roger C. Phillips; William J. Fitzpatrick

(57) ABSTRACT

A multi-language attraction communication device is provided wherein a guest selects a particular language file corresponding to an audio file coordinated with at least one entertainment activity. The communication device includes a memory for storing multiple language files for at least one entertainment activity and a processor. The processor is configured to access the memory, in response to a selected language file for the at least one entertainment activity, and to communicate the language file for review by a guest in real time coordination with the at least one entertainment activity. A method of providing audio to guests at an entertainment activity is also provided.

15 Claims, 4 Drawing Sheets

ATTRACTION MULTILANGUAGE AUDIO DEVICE AND METHOD

BACKGROUND OF THE INVENTION

1. Field of the Invention

The subject matter described herein relates generally to devices and methods for access to audio tracks provided at themed entertainment parks.

2. Related Art

Theme parks are an integral part of global tourism. On any given day, a theme park, in any location, may welcome a large number of international visitors that may not be fluent in the language of the host country where the park is located. Also, the park may also have guests, both foreign and domestic, who are hearing impaired. All of these guests are, unfortunately, unable to understand the audio provided and therefore unable to experience the attractions to the full extent that they were designed and intended to be experienced.

The intended experience of theme parks, such as Universal Studios Islands of Adventure, includes a real-time combination of audio and action. To achieve this experience, numerous entertainment attractions have computer controlled audio files arranged to coincide in real time with the entertainment action. For example, the Cat in the Hat attraction provides audio tracks synchronized with the ride so that visitors experience, from audio and the action, the story of the Cat in the Hat. Accordingly, it is evident that the audio tracks play a crucial role on delivering the full experience required to fully enjoy the attraction.

Currently, most guest accessed communication systems at theme parks provide only self-paced audio tours from a pre-programmed database that is contained on a park owned and maintained "rental unit". These systems do not interact with the ride control systems of the theme park and thus do not provide an adequate substitute for the intended attraction experience as experienced by guests using the primary audio program that is broadcast by loudspeaker in the attraction. In some cases there are guest accessed communication devices that do interact with simple sensor driven events, but these rudimentary systems are not integrated into the master ride and show system, instead they are simply playing back a self contained pre-recorded track at an approximate physical location on the "rental unit". Generally, current guest accessed communication devices are single purpose devices that solely provide an alternate language or hearing impaired output. Typically these devices are expensive to produce, unwieldy, and must be rented from the park's operator at risk of financial expense and upkeep with frequent loss, damage and pilferage.

Accordingly, to date, no suitable device or method exists for providing a fully coordinated audio and timed electronic interpretive experience to those who speak a language that is different from that of the host country in which the business is located, or for those who are hearing impaired.

BRIEF DESCRIPTION OF THE INVENTION

In accordance with an embodiment of the present invention, a multi-language attraction communication device is provided wherein a guest selects a particular language file corresponding to an audio file coordinated with at least one entertainment activity. The communication device comprises a memory for storing multiple language files for at least one entertainment activity and a processor. The processor is configured to access the memory, in response to a selected language file for the at least one entertainment activity, and to communicate the language file for review by a guest in real time coordination with the at least one entertainment activity.

In accordance with another embodiment of the present invention, a method of providing audio to guests at an entertainment activity comprises making available multiple language files corresponding to an audio file played during an entertainment activity; queuing the language file chosen by each guest; and synchronizing the delivery of the language file to the guest with the entertainment activity.

BRIEF DESCRIPTION OF THE DRAWINGS

The following detailed description is made with reference to the accompanying drawings, in which.

DETAILED DESCRIPTION OF THE PREFERRED EMBODIMENT

One embodiment of the present invention concerns a multi-language attraction audio file and/or the text of the audio file that is accessible by a guest at, e.g. an amusement or theme park. In one particular embodiment, the requested audio and/or text may be accessed, e.g., by a guest's personal cellular telephone and/or personal digital assistant (PDA).

Figure 1:
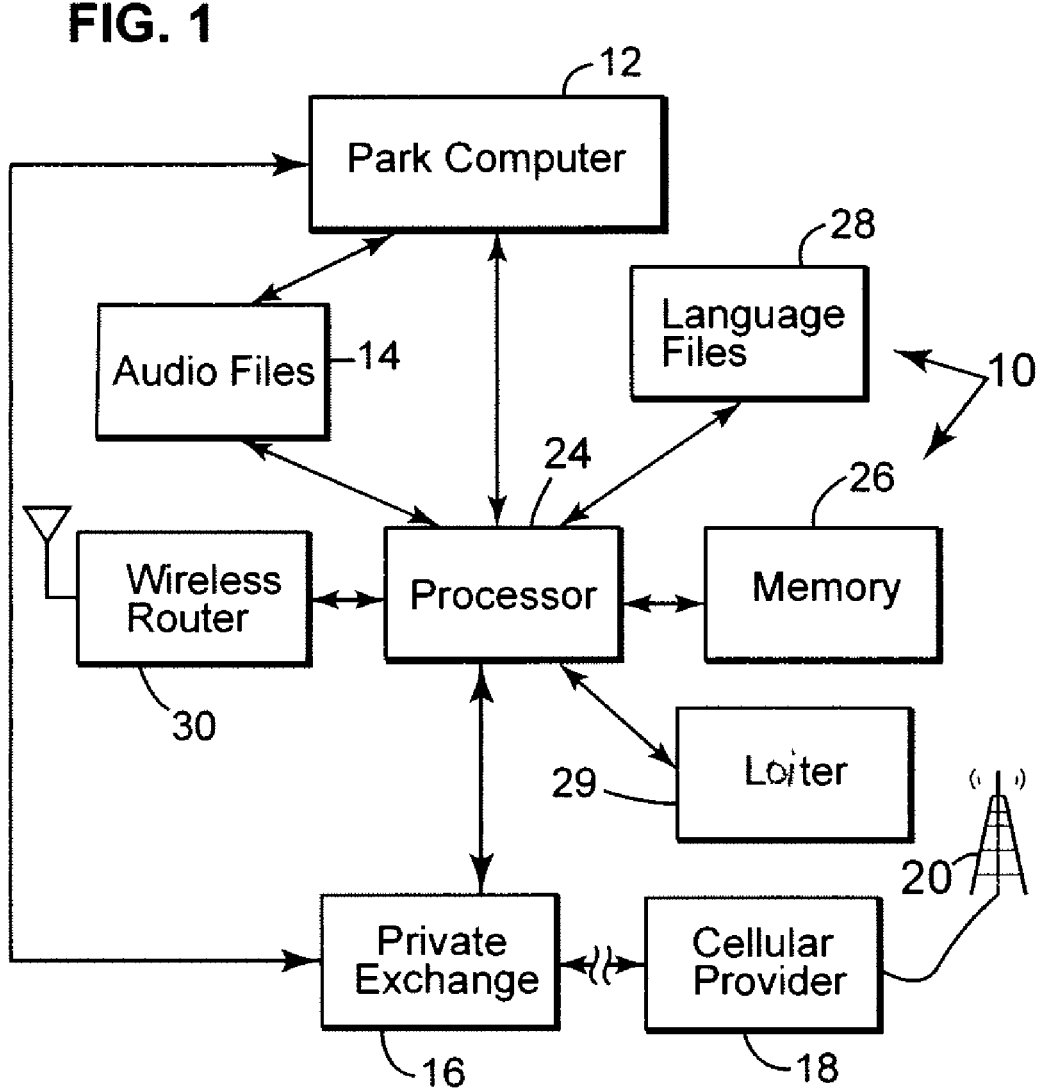
FIG. 1 is a block diagram showing an attraction communications device in accordance with an embodiment of the present invention.

Referring now to FIG. 1, an audio communications device in accordance with one embodiment of the present invention is illustrated generally at 10. In this embodiment, the communications device 10 communicates with a park computer 12 having associated audio files 14.

The park computer 12, in one embodiment, comprises a network system for command and control over various attractions or entertainment activities, e.g., rides, games and shows of a theme park (not shown). It will be appreciated that, and in an optional embodiment, the park computer may comprise a standalone computer for controlling a single entertainment activity.

As illustrated, the park computer 12 accesses the audio files 14 for use in connection with the operation of the entertainment activities. The audio files 14 comprise audio tracks for each of the various entertainment activities and are queued by the park computer 12 for play with proper timing and sequence to the action of each entertainment activity. It will be understood that the audio tracks are recorded in the language of the host country where the theme park is located.

The park computer 12 communicates with a telecommunications switch or private exchange 16 that, in turn, is connected in a known manner through a public exchange (not shown) with a cellular provider 18 having a multitude of towers 20. In this way, telephone calls to, and from within the theme park itself by a guest 22 (FIG. 2), are routed by the private exchange 16 to various telephone extensions within the park such as that corresponding to guest services (not shown). Also, it will be appreciated that park personnel may remotely monitor operations of the park computer 12 via data communications routed through the private exchange 16.

Figure 2:
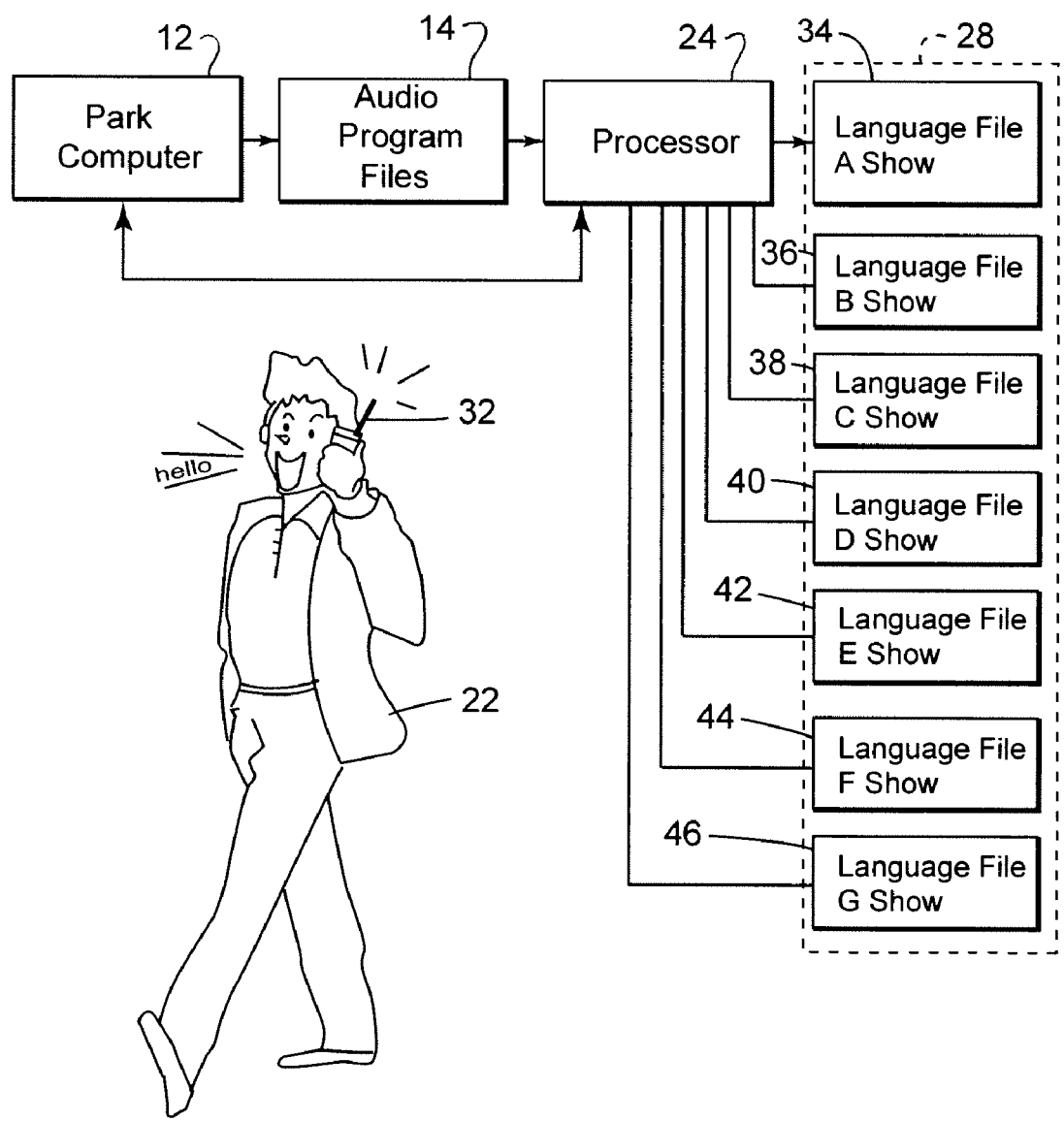
FIG. 2 is a block diagram showing one aspect of the attraction communications device of FIG. 1.

In accordance with an embodiment of the present invention and referring now also to FIG. 2, the communication device 10 (from FIG. 1) comprises a processor 24, memory 26, language files 28 and a wireless router 30. The processor 24 utilizes the memory 26 for working storage in a known manner and, in this embodiment, is configured, e.g., via a software program, to communicate with each of the park computer 12, audio files 14, language files 28, wireless router 30 and private exchange 16 to provide selected audio and/or audio text for a particular entertainment activity, in a particular language, in response to a request by a guest 22. In an optional embodiment, the processor 24 is an integral part of the park computer 12.

The processor 24 is configured to communicate with the private exchange 16 to transmit/receive voice and data information to/from one or more cellular phones such that at 32, actuated by the guest 22, via the cellular provider 18 and tower 20. The processor 24 is configured to access the audio files 14 to generate the language files 28, as shown in more detail in FIG. 2, to provide the selected translated audio/audio text. As shown at 34, a language file A, e.g. comprising a stored English language translation of an audio file, may be provided for a particular show X at a theme park, such as the Cat in the Hat attraction at Universal Studios Islands of Adventure in Orlando, Fla. Shown at 36, a language file B, e.g. comprises a French language translation for the show X. It will be understood that various other stored translations of the audio (C-G) for the show X are illustrated at 38-46. The audio files 14 and the language files 28 may be stored on any suitable memory such as EPROM, FLASH, or magnetic hard disk and in any suitable format such as MP3.

The processor 24 is configured to communicate with the park computer 12 to synchronize and queue the selected translation of audio and/or audio text with a particular entertainment activity. For example, synchronization (or real-time coordination) may be accomplished via simultaneous communication of blocks of data corresponding to the audio and/or audio text. In one embodiment, the blocks of data may comprise one or more data packets. Also, the cellular phone 32 may be configured to signal to the guest 22, such as by vibrating, upon receipt of a particular block of audio and/or text.

In accordance with one embodiment, a guest 22 is given a telephone number to dial on the cellular telephone 32 where the guest may connect with a program run by the processor 24 via tower 20, cellular provider 18 and the private exchange 16. This telephone number may be disclosed to guests inside the actual attraction on a prominently displayed digital message board, allowing the number that guests called to be changed show by show to avoid guests calling in too early or too late and hearing the audio program at an inopportune time. This also will allow the parks operator to change the telephone number as they see fit to reduce nuisance calls into the system. In response to the call, the cell phone 32 will receive, e.g., an audio or text menu, via an automated system or a program run by the processor 24, to select among the various language files available in the stored language files 28 for each of the various entertainment activities. Also, a guest may request text where desired. Upon a selection being made, the processor 24 is configured to queue the selected language file 28 for delivery and the guest's call is passed to, e.g., a loiter function 29 with other guests (not shown) until the particular language file can be delivered generally contemporaneously with the delivery of the audio file 14 for the particular entertainment activity. The loiter function can be a simple count down to the beginning of a show, with the voice of an electronic "host" informing the guest at 15 second intervals that the show is going to start in "one minute; forty five seconds; thirty seconds; fifteen seconds" etc. For guests that have selected to utilize the text version of the system 14 a counter on their handset will display the remaining minutes and seconds until the program begins. This is accomplished via communication with the park computer 12 that, in this embodiment, provides operational control of the action associated with the entertainment activity. The loiter function 29 provides a virtual holding space while guests 22 are waiting for the attraction to start and each guest may receive audio or text messages of entertainment and/or advertising. After passage through the loitering function, the guest 22 will receive the particular audio and/or text translation of choice simultaneously displayed as text or as sound on their own handset 32 speaker with the particular entertainment activity as it begins in the primary venue.

Further, the guest 22 may also be provided with an option to download a software application to provide an interface between the as configured processor 24 and the cellular telephone 32. That way, it may be possible for the as configured processor 24 to access, where supported, the phone's features and provide, for example, language translation, along with closed caption capabilities. Since current cellular phone software is based on the Java programming language (most international phone carriers, Sprint, TMOBILE, Cingular) or the BREW programming language (Verizon), this software may be remotely modified to provide enhanced capabilities, such as changing the language mid show and the ability to provide additional instructions on usage in the appropriate language.

Figure 3:
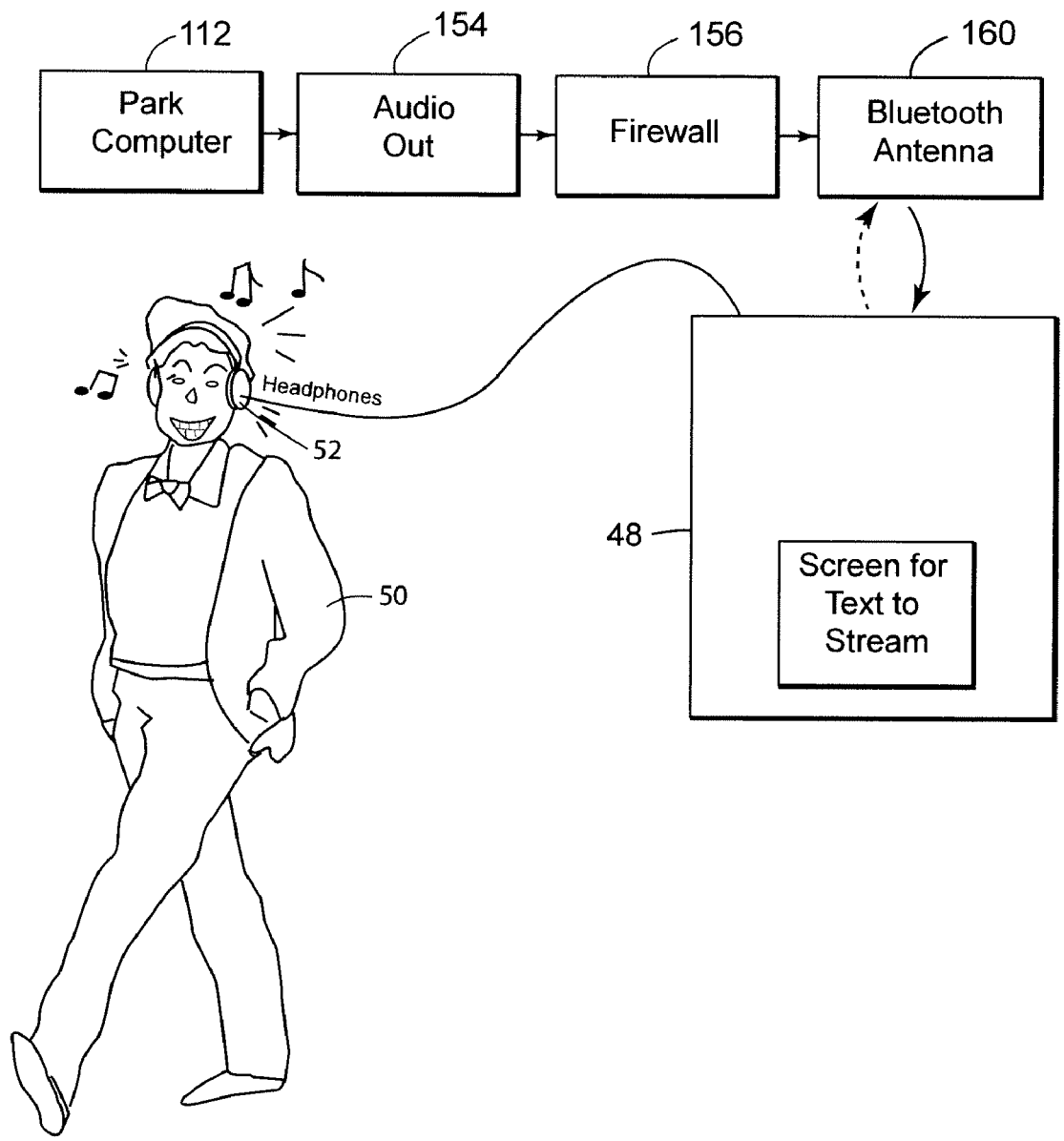
FIG. 3 is a block diagram showing another embodiment of an attraction communications device in accordance with the present invention.

Referring now to FIGS. 1 and 3 and in another aspect of this embodiment, the wireless router 30 is connected to the processor 24 for communicating with a personal digital assistant 48 (PDA) or any similarly capable device such as a cellular telephone type device such as a "Blackberry" sold by RIM Corporation that held by a guest 50. The processor 24, in addition to communicating with the private exchange 16, is configured to communicate in a similar manner with the wireless router 30 to provide the guest 50 with a choice to select audio and/or text from the language files 28. The PDA 48 may further comprise headphones 52 for noise abatement and may comprise a heads up display (not shown). It will also be understood that the PDA 48 may comprise memory for storage of the text and/or audio for future replay. Further, the guest 50 may also be provided with an option to download a software application to assist in the streaming of the audio and/or text.

Referring now to FIG. 3, another embodiment of the present invention is shown. In this embodiment, rather than employing a separate processor 24, a park computer 112 provides audio out 154 that is transmitted using a known common access protocol such as that sold under the mark BLUETOOTH and antenna 160 to one or more of the PDAs 48. A firewall 156 is provided and functions in a known manner to prevent unauthorized intrusions. As described above concerning the processor 24, the computer 112 provides for the guest 50 to choose between selected language files and between audio and/or text for delivery to the PDA 48 in synch with the audio track of the entertainment activity.

Figure 4:
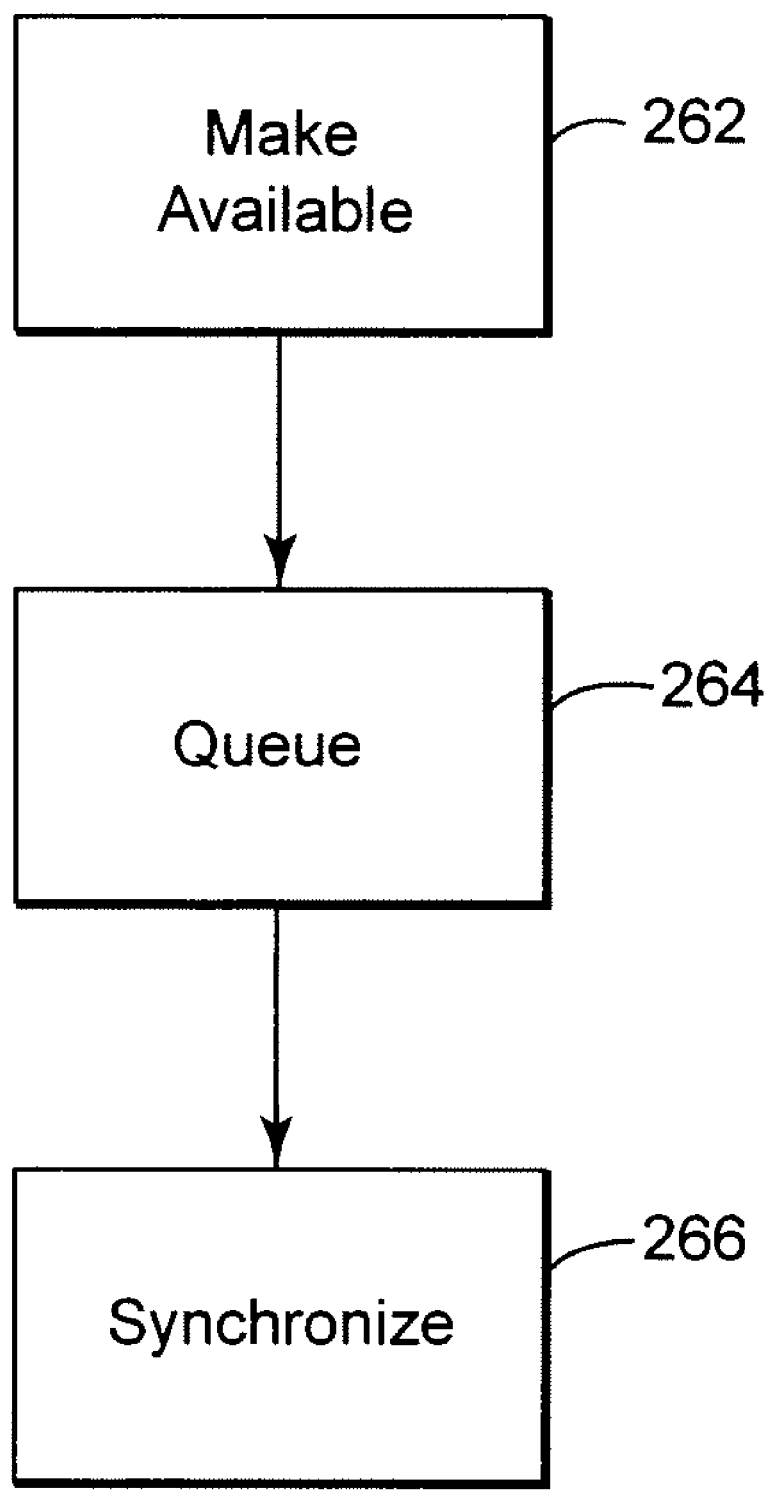
FIG. 4 is a flow diagram illustrating a method of providing audio to guests at an entertainment activity in accordance with another embodiment of the present invention.

As shown in FIG. 4, a method of providing audio to guests at an entertainment activity in accordance with another embodiment of the present invention comprises, as shown at 262, making available multiple language files corresponding to an audio file played during an entertainment activity. Next, as shown at 264, queuing the language file chosen by each guest and then, as shown at 266, synchronizing the delivery of the language file to the guest with the entertainment activity.

In another optional embodiment, synchronizing the delivery of the language file to the guest with the entertainment activity may comprise having a user input a command to a keypad of e.g., the cellular phone 32 or PDA 48, or say a command phrase that would inform the as configured processor 24 when to start playing the recorded message. This phrase or command will be unique to each instance of the ride and displayed right before the start of an attraction. This is found to be extremely beneficial for rides or entertainment that each or only a few guests 22 or 50 begin at one time.

In one particular embodiment, a guest 22 or 50 dials in or otherwise gains access and queues up for a translation. At this point, the guest 22 or 50 may wait for a display message or voice to tell them what pass code or pass phrase to say and this may starts the translation at the proper time. Also, a very loud audio cue, vibration or otherwise, that the microphone of the cell phone could here that would trigger the audio translation to begin at a certain time. For a system using Bluetooth or some other short-range wireless protocol (this also includes cellphones) once the PDA or cellphone enters the wireless field it is given a command signal to start playback.

Technical effects of the herein described systems and methods include providing a guest with a choice of a language to receive translated audio, e.g. with a personal cellular telephone or a PDA, and, for example, in connection with an attraction at a theme park.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A multi-language attraction communication device wherein a guest selects a particular language file corresponding to an audio file coordinated with at least one entertainment activity, the communication device comprising:
 a memory for storing multiple language files for at least one entertainment activity; and
 a processor being configured to access the memory, in response to a selected language file for the at least one entertainment activity, and to communicate the language file to a cellular phone operated by the guest for review by the guest in real time coordination with the at least one entertainment activity, wherein the processor is further configured to communicate with a private exchange, the private exchange being in communication with a cellular provider and the cellular phone operated by the guest.

2. The communication device of claim 1, wherein the processor is further configured to communicate with a network router that, in turn, communicates with a personal digital assistant operated by a guest.

3. The communication device of claim 2, wherein the processor is configured to employ a loiter function to queue up multiple personal digital assistants held by multiple guests.

4. The communication device of claim 1, wherein the processor is integral with a park computer.

5. The communication device of claim 1, wherein the processor communicates with a park computer for real time coordination of the language file with the entertainment activity.

6. The communication device of claim 1, wherein the processor is configured to employ a loiter function to queue up multiple cell phones held by multiple guests.

7. The communication device of claim 1, further employing a protocol that allows for common wireless access by multiple devices.

8. The communication device of claim 1, wherein the entertainment activity is located at a theme park and comprises at least one of a game, a show and a ride.

9. A method of providing audio to guests at an entertainment activity, comprising:
 making available multiple language files corresponding to an audio file played during an entertainment activity;
 queuing the language file chosen by each guest;
 synchronizing the delivery of the language file to the guest with the entertainment activity, wherein synchronizing the delivery occurs via a processor being configured to access the multiple language files; and
 communicating the language file to a cellular phone operated by the guest for review by the guest in real time coordination with the entertainment activity, by communicating with a private exchange, the private exchange being in communication with a cellular provider and a cellular phone operated by the guest.

10. The method of claim 9, wherein making available multiple language files comprises providing a wireless network for communication with a personal digital assistant carried by a guest.

11. The method of claim 9, wherein making available multiple language files comprises making available audio and text.

12. The method of claim 9, further comprising providing loitering for guests awaiting start of the entertainment activity.

13. The method of claim 9, wherein the entertainment activity is located at a theme park and comprises at least one of a game, a show, or a ride.

14. The method of claim 9, further comprising providing an option to a guest to download a software interface for a guest's cellular telephone or PDA.

15. The method of claim 9, wherein synchronizing delivery comprises inputting a command to a cellular phone or to a PDA to start the delivery of the language file.

* * * * *